US010762411B1

(12) United States Patent
Parshin et al.

(10) Patent No.: US 10,762,411 B1
(45) Date of Patent: Sep. 1, 2020

(54) SMART SHELF WITH SELF CALIBRATION

(71) Applicant: Amazon Technologies, Inc., Seattle, WA (US)

(72) Inventors: Sergey Parshin, Redcliffe (AU); Jon R. Ducrou, West End (AU); Bradley Nathaniel Gray, Auchenflower (AU); Ryan David Hapgood, Belmont (AU); Matthew Lake, The Gap (AU); Muthu Pandian Shanmugarajan, Greenslopes (AU); Jeanette Rogers, Mount Gravatt East (AU); Uladzimir Silchanka, Boondall (AU); Yeyang Yu, Logan Central (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/290,297

(22) Filed: Mar. 1, 2019

(51) Int. Cl.
*G06K 19/077* (2006.01)
*G06K 19/07* (2006.01)
*G06Q 10/08* (2012.01)

(52) U.S. Cl.
CPC ... *G06K 19/07773* (2013.01); *G06K 19/0725* (2013.01); *G06Q 10/0833* (2013.01)

(58) Field of Classification Search
CPC .... G01S 2013/466; G01S 5/0252; G01S 5/12; G01S 5/14; G01S 13/9303; G01S 1/02; G01S 13/72; G01S 13/762; G01S 13/84; G01S 13/878; G01S 7/42; G01S 13/36; G01S 13/4409; G01S 13/538;
(Continued)

(56) References Cited

U.S. PATENT DOCUMENTS 9,740,892 B2* 8/2017 Lombardi .......... G06K 7/10019
9,977,865 B1* 5/2018 LaBorde ................ G16H 40/63
(Continued)

FOREIGN PATENT DOCUMENTS

WO 20170061881 A1 4/2017
WO 20180183571 A1 10/2018

OTHER PUBLICATIONS

D. Yan et al., "Leveraging Read Rates of Passive RFID Tags for Real-Time Indoor Location Tracking", CIKM'12, Oct. 29-Nov. 2, 2012, Maui, HI, USA, 10 pages. <https://www.cse.ust.hk/~wilfred/paper/cikm12c.pdf>.
(Continued)

*Primary Examiner* — Daniel Previl
(74) *Attorney, Agent, or Firm* — Patterson + Sheridan, LLP

(57) ABSTRACT

A system that performs self-calibration for tracking packages includes a frame providing storage locations for storing items, radio frequency identification (RFID) tags disposed in the storage locations, and an RFID antenna(s). The system determines a distance between each RFID tag and the RFID antenna(s) and monitors signal characteristics from each RFID tag. For each RFID tag, the system generates (i) at least one first parameter indicative of an environmental condition(s) at a location of the RFID tag and (ii) at least one second parameter indicative of a response rate behavior of the RFID tag, based on the signal characteristics and the distance between the RFID tag and the RFID antenna(s). The system tracks an RFID tagged item located in one of the storage locations based at least in part on the first and second parameter(s) for each of the RFID tags.

20 Claims, 8 Drawing Sheets

(58) Field of Classification Search
CPC ...... G01S 13/586; G01S 13/66; G01S 13/765;
G01S 13/785; G01S 13/787; G01S
2007/4082; G01S 3/48; G01S 3/74; G01S
7/003; G01S 7/12; G01S 7/40; G06Q
10/08; G06Q 10/087; H04W 4/029;
G06K 19/0723; G06K 7/10019; G06K
7/10108; G06K 7/10376; G03B 17/50;
H01Q 21/28; H01Q 21/29; H01Q 25/04;
H04B 1/1607; H04B 7/15542
USPC ......... 340/572.1–572.9, 568.1, 539.1, 815.4,
340/10.1
See application file for complete search history.

(56) References Cited

U.S. PATENT DOCUMENTS

| | | | | |
|---|---|---|---|---|
| 10,262,172 | B1* | 4/2019 | Niranjayan | G06K 7/10425 |
| 2005/0285739 | A1* | 12/2005 | Velhal | G08B 21/0227 |
| | | | | 340/572.1 |
| 2006/0022824 | A1* | 2/2006 | Olsen, III | B07C 7/005 |
| | | | | 340/572.1 |
| 2009/0102609 | A1* | 4/2009 | Garber | G06K 7/0008 |
| | | | | 340/10.1 |
| 2010/0214078 | A1* | 8/2010 | Chen | G06K 19/0701 |
| | | | | 340/10.5 |
| 2010/0225480 | A1* | 9/2010 | Bloy | H01Q 3/36 |
| | | | | 340/572.1 |
| 2013/0201003 | A1 | 8/2013 | Sabesan et al. | |
| 2015/0379317 | A1* | 12/2015 | Kelly | G06Q 10/087 |
| | | | | 705/28 |
| 2019/0101463 | A1* | 4/2019 | Fly | G01L 5/0066 |

OTHER PUBLICATIONS

H. Xu, et al., "An RFID Indoor Positioning Algorithm Based on Bayesian Probability and K-Nearest Neighbor", MDPI Journal on Sensors 2017, 17 pages. <https://www.mdpi.com/1424-8220/17/8/1806>.
K. Chawla, et al., "Real-Time RFID Localization Using RSS", IEEE 2013, 6 pages. <https://www.cs.virginia.edu/~robins/papers/Real-Time_RFID_Localization_Using_RSS__.pdf>.
J. Choi et al., "Consideration for Performance of Passive UHF Far-Field RFID Tag to Tag Interference based Localization System", IEEE 2012, 4 pages. <https://zapdf.com/consideration-for-performance-of-passive-uhf-far-field-rfid.html>.
J. Choi, et al., "Passive UHF RFID-Based Localization Using Detection of Tag Interference onSmart Shelf", IEEE Transactions on Systems Man and Cybernetics Part C (Applications and Reviews), Mar. 2012, 9 pages. «https://www.researchgate.net/profile/Daniel_Engels/publication/220508627_Passive_UHF_RFID-Based_Localization_Using_Detection_of_Tag_Interference_on_Smart_Shelf/links/00b49518818d057046000000/Passive-UHF-RFID-Based-Localization-Using-Detection-of-Tag-Interference-on-Smart-Shelf>.
L. Qui, et al., "PATL: A RFID Tag Localization based on Phased Array Antenna", Scientific Reports, vol. 7, Article No. 44183, Published Mar. 15, 2017, 12 pages. <https://www.nature.com/articles/srep44183>.
Invitation to Pay Additional Fees and Partial Search Report for International Application No. PCT/US2020/019657, dated May 13, 2020, 13 pp.

* cited by examiner

SMART SHELF WITH SELF CALIBRATION

BACKGROUND

Retailers, wholesalers, and other product distributors typically maintain an inventory of various items that may be ordered, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. In some cases, an associate may manually place an item(s) in a staging area as part of a production distribution workflow. For example, the staging area can include shelves designated for holding pre-assembled customer orders before the orders are delivered to the customer.

Conventional systems that use staging areas typically require associates to manually enter information for each item they are interacting with (e.g., by scanning a barcode on the item). In some cases, associates may be required to enter multiple pieces of information (e.g., multiple barcodes) for a single item. Moreover, once an associate places the item in its destination location, conventional systems may again require the associate to enter information associated with the destination location (e.g., by scanning a barcode associated with a particular location in the staging area). Each of these manual transactions can impact efficiency (e.g., the number of items processed within a given period of time) and increases the likelihood that a problem will occur (e.g., the barcode for the wrong staging area being scanned).

BRIEF DESCRIPTION OF DRAWINGS

Various embodiments in accordance with the present disclosure will be described with reference to the drawings, where like designations denote like elements.

DETAILED DESCRIPTION

Figure 1:
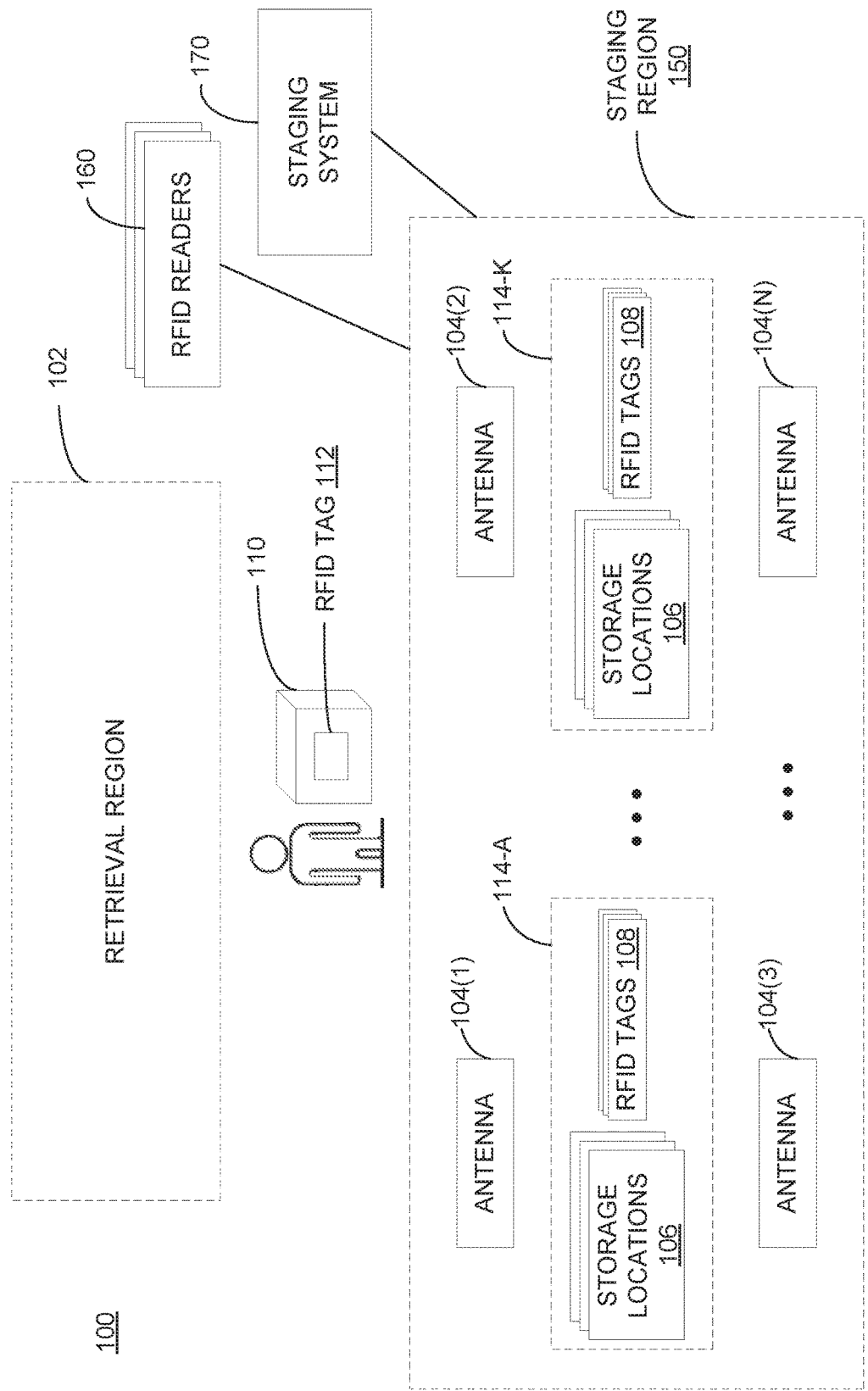
FIG. 1 is a block diagram illustrating an inventory system having multiple staging areas for holding packages, according to one embodiment.

Inventory systems are utilized by many entities (e.g., retailers, wholesalers, fulfillment centers, etc.) for storing and managing inventory. For example, some retailers (e.g., physical store, online store, etc.) may utilize staging areas (also referred to as "staging walls") in a fulfillment center to temporarily hold pre-assembled customer orders. When an order for a specific inventory item(s) needs to be filled by the fulfillment center, an associate typically retrieves the item(s) and places the item(s) in the staging area.

Staging areas according to one embodiment described herein utilize entire racks of shelves, with each shelf having multiple storage locations for various inventory items. The inventory items may include packages, bags, totes, individual items, etc. Each storage location is in proximity to one or more radio frequency identification (RFID) tags to aid in sensing the location of objects placed in the storage location. In addition, each package that is placed in the staging area is RFID tagged, e.g., in order to identify the particular storage location that the package is placed in. An RFID reader(s) monitors the RFID tags in the staging area, e.g., via an RFID antenna(s) placed near (or in proximity to) the staging area.

In systems that use RFID tags for tracking packages, a package is typically located by performing triangulation (and/or a proximity search) using the RFID signals received from the RFID tagged package and the RFID signals received from the RFID tags in proximity to the storage locations. One challenge associated with this approach is that the RFID signal characteristics are generally unstable and varying due to, e.g., environmental factors and other atmospheric phenomena. For example, the RFID signal characteristics (e.g., received signal strength indication (RSSI)) may be susceptible to conditions that include, but are not limited to, noise, interference (e.g., interference from other RFID tags), attenuation from nearby objects, radio signal multi-path, reflection, refraction, diffraction, absorption, polarization, scattering, etc. In addition, the RFID signal characteristics can vary due to varying RFID tag performance over time. For example, RFID tag properties, such as tag sensitivity, signal strength, battery life (in the case of passive RFID tags), etc., can decline or degrade over time, affecting the RFID signal characteristics. These environmental and temporal factors can significantly impact the efficiency and accuracy of the brute force triangulation approach.

Embodiments presented herein describe a staging system that is configured to perform self-calibration in order to account for the dynamically changing environment when tracking packages placed in a staging area. In one embodiment, the staging system is implemented as a "smart shelf" in the staging area. The "smart shelf" has a frame with one or more rows and one or more columns providing different storage locations for storing items. The staging area is deployed with one or more reference RFID tags (e.g., with pre-configured three dimensional (3D) coordinates) surrounding (or in proximity to) each storage location. The staging area is also deployed with one or more RFID antennas (e.g., with pre-configured 3D coordinates and orientation) in proximity to the staging area.

The staging system uses the pre-configured coordinates of the reference RFID tags and the pre-configured coordinates and orientations of the RFID antennas to determine the angle (e.g., Angle of Arrival (AoA)) and distance (e.g., Euclidean distance in 3D space) between each RFID antenna and reference RFID tag. The staging system then estimates, for every combination of reference RFID tag and RFID antenna, a first parameter indicative of at least one environmental (or atmospheric) condition at the location of the reference RFID tag, based on the RFID signal characteristics of the reference RFID tag and the location information (e.g., distance and angle) associated with the respective combination of reference RFID tag and RFID antenna. In one example, the first parameter may include a path loss exponent (PLE) coefficient, which is used to derive the distance between an RFID antenna and a reference RFID tag from a signal strength value received from the reference RFID tag (e.g., using the Friis transmission equation). In this manner, the staging system is able to build a surface model of parameters representative of the environmental conditions at each reference RFID tag location in the staging area.

In some embodiments, the staging system may use the known location information of the reference RFID tags and RFID antennas to generate, for each combination of reference RFID tag and RFID antenna, a second parameter(s) indicative of a tag response rate behavior of the reference RFID tag to requests (or interrogations) from the RFID antenna. In one example, the second parameter(s) may include one or more decay coefficients that are used to derive the distance (between the reference RFID tag and the RFID antenna) from a tag response rate. In this manner, the staging system is able to build a decay model of parameters representative of changes in tag response rate for different distances at each reference RFID tag location in the staging area.

The staging system uses the first and second parameters to account (or calibrate) for the volatile and dynamic conditions when tracking an RFID tagged package (or item). For example, the staging system may periodically (e.g., at every predetermined time interval) determine and update the first and second parameters to maintain an accurate representation of the dynamic conditions at each reference RFID tag. When the staging system detects an (unknown) package RFID tag (e.g., in the staging area), the staging system determines the distance between the package RFID tag and each reference RFID tag using the first and second parameters for that reference RFID tag. The staging system uses these distances as inputs to a first machine learning algorithm (e.g., a nearest neighbor search algorithm, such as a k-nearest neighbors (k-NN) algorithm) in order to determine the one or more nearest (e.g., within a threshold distance) reference RFID tags to the package RFID tag. The staging system then inputs the set of nearest reference RFID tags (output from the first machine learning algorithm) to a second machine learning algorithm (e.g., a Monte Carlo algorithm) in order to determine the location (e.g., the particular storage location) of the package RFID tag within the staging area. By performing RFID localization of a RFID tagged package using the first and second parameters of reference RFID tags (e.g., as opposed to using a distance derived solely from RSSI), embodiments can more accurately determine the location of an RFID tagged package, relative to conventional localization techniques.

FIG. 1 is a block diagram illustrating an inventory system 100 having multiple staging areas 114 A-K for holding packages, according to one embodiment. The inventory system 100 may be arranged in a facility, warehouse (e.g., distribution facility, fulfillment center), retail store, etc. The inventory system 100 may be logically organized into areas or regions associated with various functions. In the depicted example, the inventory system 100 includes a retrieval region 102 and a staging region 150. An associate may retrieve items (or packages) from the retrieval region 102, e.g., in order to fulfill an order received from a customer, and place the items into the staging region 150. In practice, depending on the size of the inventory system 100, the facility or warehouse may hold more than one of the retrieval region 102 or the warehouse may be configured without the retrieval region 102. Similarly, depending on the size of the inventory system 100, the facility or warehouse may hold more than one of the staging region 150.

The staging region 150 includes one or more staging areas 114 A-K for storing pre-assembled customer orders. As shown, each staging area 114 A-K includes multiple storage locations 106 and one or more reference RFID tags 108. The reference RFID tags 108 may be distributed (or deployed) in a staging area 114 in various locations to aid the inventory system 100 in determining the locations of packages placed in the storage locations 106. For example, a given staging area 114 may be deployed with any number of reference RFID tags 108 sufficient to enable the inventory system 100 to determine the location of a package in one of the storage locations 106. Similarly, the reference RFID tags 108 may be distributed across (or within) the staging area 114 in any manner sufficient to enable the inventory system 100 to determine the location of a package in one of the storage locations 106. In one embodiment, each storage location 106 may be in proximity to (e.g., surrounded by) one or more of the reference RFID tags 108. As described below, in this embodiment, the different sets of reference RFID tags 108 in proximity to the different storage locations 106 may be used by the inventory system 100 to determine in which of the storage locations 106 a particular package detected by the inventory system 100 is placed in.

The staging region 150 also includes one or more RFID antennas 104 deployed in various locations around (e.g., in proximity to) the staging areas 114 A-K for reading reference RFID tags 108 and RFID tagged packages (e.g., package RFID tag 112 on package 110). The reference RFID tags 108 and/or the package RFID tags 112 may include passive RFID tags or active RFID tags. A staging area 114 may be deployed with any number of RFID antennas 104 sufficient to enable the inventory system 100 to determine the location of packages in the storage locations 106. Similarly, the RFID antennas 104 may be distributed (e.g., with different locations and/or orientations) across a staging area 114 in any manner sufficient to enable the inventory system 100 to determine the location of packages in the storage locations 106. The RFID antennas 104 are coupled to one or more RFID readers 160. In one embodiment, each RFID antenna 104 is coupled to a single RFID reader 160. In one embodiment, an RFID reader 160 can be coupled to more than one RFID antenna 104.

One or more of the staging areas 114 A-K may be implemented as a physical structure (e.g., frame) to hold various items. The staging area 114 may have a physical length, width, and height that may be standardized or varied within the inventory system 100. As used herein, the staging areas 114 A-K may be configured to hold various types and sizes of items. In one embodiment, the staging areas 114 A-K can include a defined region on the floor of the facility. For example, tape or paint may be used to define the boundaries of the staging area(s) 114 A-K which the associate can use when placing items. In one implementation, a staging area 114 may be formed as a rack having multiple shelves to support various types of inventory items. For example, the staging area 114 can include a shelving frame with multiple rows and columns arranged in a grid to form multiple storage locations 106. In another example, a staging area 114 can include a shelving frame with a single row or a single column. One example of a staging area 114 that is implemented as a shelving frame is described below in more detail with reference to FIG. 2. In general, the staging areas 114 A-K can be any suitable apparatus with a form factor for holding multiple various items (e.g., packages, bins, totes, etc.).

The inventory system 100 includes a staging system 170 that is configured to perform self-calibration to account for dynamic environmental conditions when tracking packages placed in the staging region 150. For example, as described further below, the staging system 170 uses the known (e.g., pre-configured) locations of the reference RFID tags 108 and the known locations and orientations (e.g., antenna directions) of the RFID antennas 104 to generate first and second parameters (e.g., PLE coefficients, decay coefficients, etc.) representative of the environmental and temporal conditions present at each location of the reference RFID tags 108. In one embodiment, the staging system 170 may continually (e.g., at predetermined time intervals) monitor the reference RFID tags 108 in order to update the first and second parameters. This allows the staging system 170 to maintain a model of the environmental and temporal conditions that are present at the locations of the reference RFID tags 108, e.g., in the event the staging system attempts to track an RFID tagged package placed in one of the staging areas 114 A-K.

Assume, for example, that an associate retrieves a package 110 from the retrieval region 102 and places the package 110 into one of the storage locations 106 within staging area 114-A. In this example, the staging system 170 can detect the presence of the package 110 based on reading its RFID tag 112 (via the RFID reader 160(s) and RFID antenna(s) 104). The staging system 170 can perform a localization procedure using the RFID signals (e.g., RSSI) from the RFID tag 112 and the first and second parameters for each reference RFID tag 108 to determine which storage location 106 within staging area 114-A the package 110 is placed in. By doing so, the staging system 170 is able to more accurately locate items placed in a staging area 114, relative to conventional localization techniques. Note that FIG. 1 illustrates merely a reference example of an environment in which the techniques presented herein for performing self-calibration can be used. Those of ordinary skill in the art will understand that the techniques presented herein can be used in other configurations of the inventory system 100.

Figure 2A:
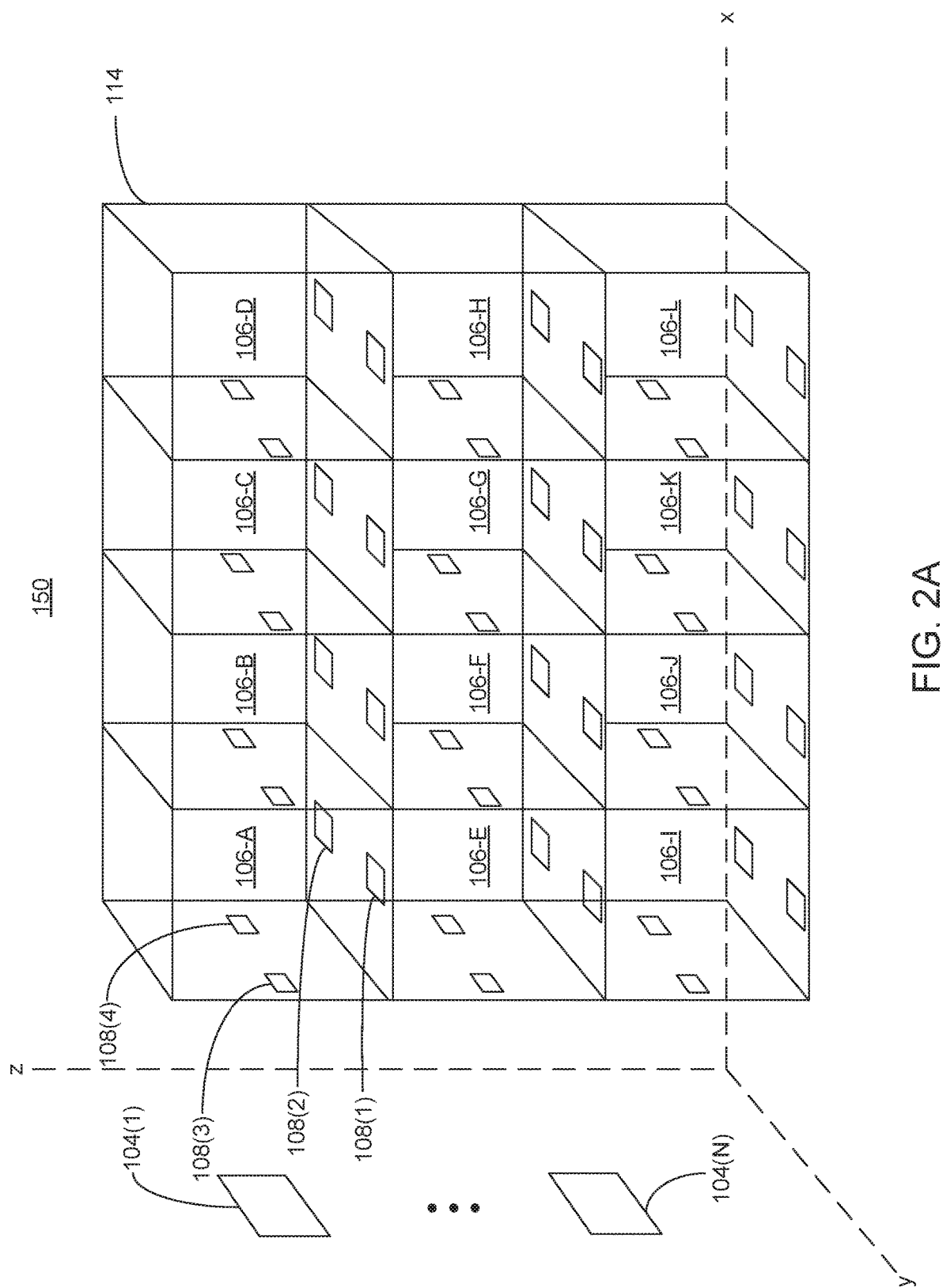
FIG. 2A depicts an example implementation of a staging area within a staging region, according to one embodiment.

FIG. 2A depicts an example implementation of a staging area 114 within a staging region 150, according to one embodiment. In this example, the staging area 114 is implemented as a shelving frame (with three rows and four columns) that provides twelve storage locations 106 A-L for holding pre-assembled orders or other items. Each storage location 106 A-L includes multiple reference RFID tags 108 placed on the inner surfaces of the storage location 106. In storage location 106-A, for example, reference RFID tags 108(1)-(2) are placed on the bottom inside surface, reference RFID tags 108(3)-(4) are placed on the left inside surface, and reference RFID tags 108(5)-(6) (which are not shown in FIG. 2A) are placed on the right inside surface. Only some of the reference RFID tags are shown referenced with the number 108 for ease of illustration.

Note that the depicted distribution of reference RFID tags 108 in FIG. 2A is provided as a reference example of how reference RFID tags 108 can be deployed within a staging area 114. Those of ordinary skill in the art will recognize, for example, that a given storage location 106 can be designed with a different number (e.g., with more or fewer than six RFID tags) and/or configuration of reference RFID tags 108. Similarly, note that the depicted shelving unit is provided as a reference example of a staging area 114. For example, a staging area 114 having twelve storage locations formed with three rows and four columns is merely representative. Those of ordinary skill in the art will recognize that the staging area 114 may be designed with more or fewer than twelve storage locations and with more or fewer rows and columns.

As also shown, RFID antennas 104(1)-(N) are deployed at various heights (e.g., locations) and various orientations (e.g., antenna directions) in proximity to the staging area 114. In this embodiment, each of the RFID antennas 104 (1)-(N) and reference RFID tags 108 has a pre-configured location (e.g., a 3D coordinate). As noted, embodiments herein use the pre-configured locations of the reference RFID tags 108 and the RFID antennas 104 to perform self-calibration for tracking RFID tagged packages. Note that the RFID antennas 104(1)-(N) depicted in FIG. 2A are shown merely for ease of illustration and that one or more RFID antennas can be deployed in other locations and other orientations (e.g., facing the staging area 114, on the sides of the staging area 114, on the shelves of the staging area 114, etc.).

Figure 2B:
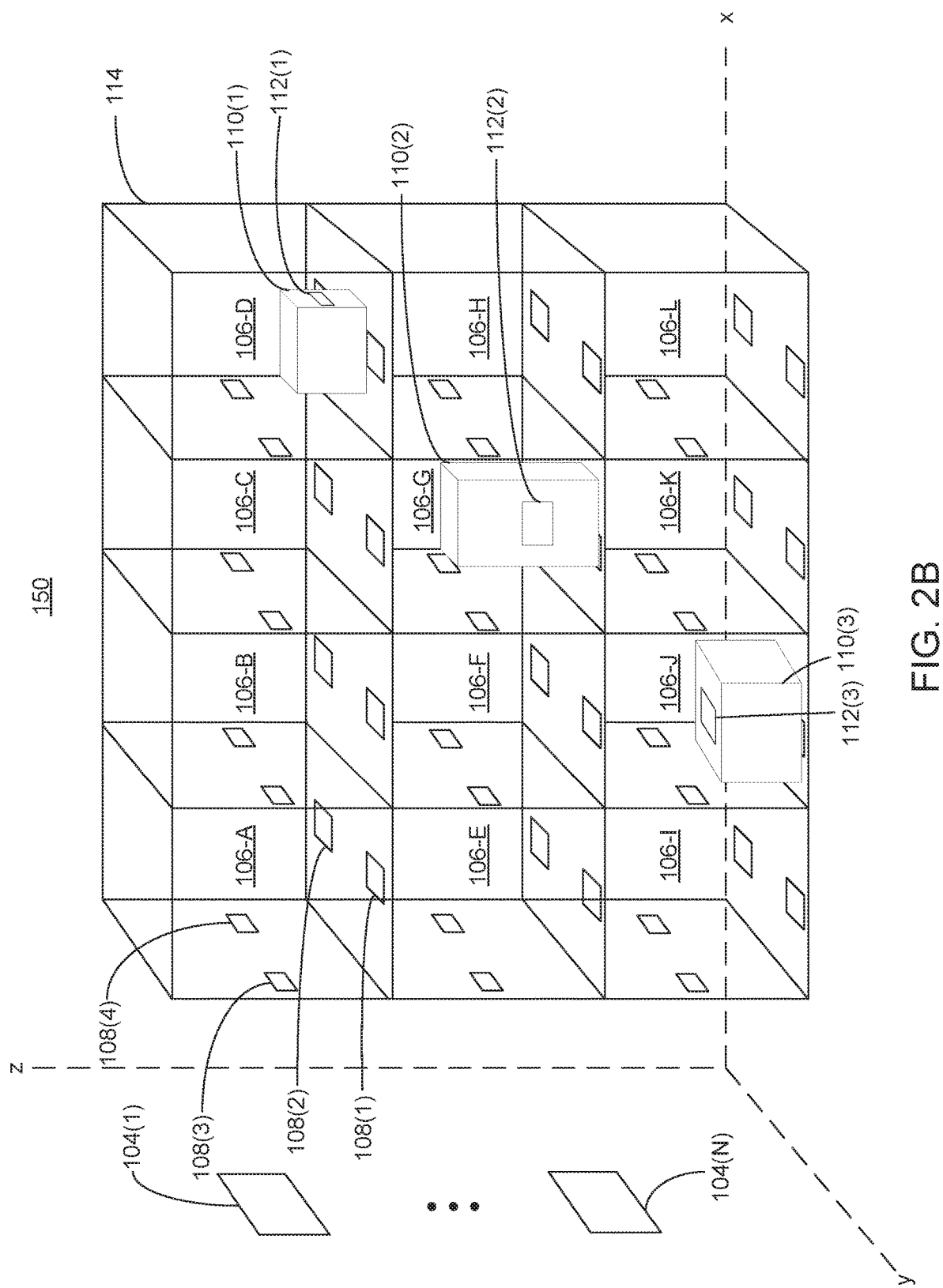
FIG. 2B depicts an example implementation of a staging area holding packages, according to one embodiment.

FIG. 2B depicts an example implementation of a staging area 114 holding one or more packages 110, according to one embodiment. As shown, the staging area 114 may be used to store packages of various sizes and shapes. Here, the storage location 106-D is used to store a package 110(1), the storage location 106-G is used to store a package 110(2), and the storage location 106-J is used to store a package 110(3). Each of the packages 110 (1)-(3) includes a respective RFID tag 112(1)-(3). As described further below, embodiments herein can accurately determine the location of the packages 110 (1)-(3) by using first and second parameters (e.g., PLE and decay coefficients) generated from the known locations of the reference RFID tags 108, and the known locations and orientations of the RFID antennas 104.

Figure 3:
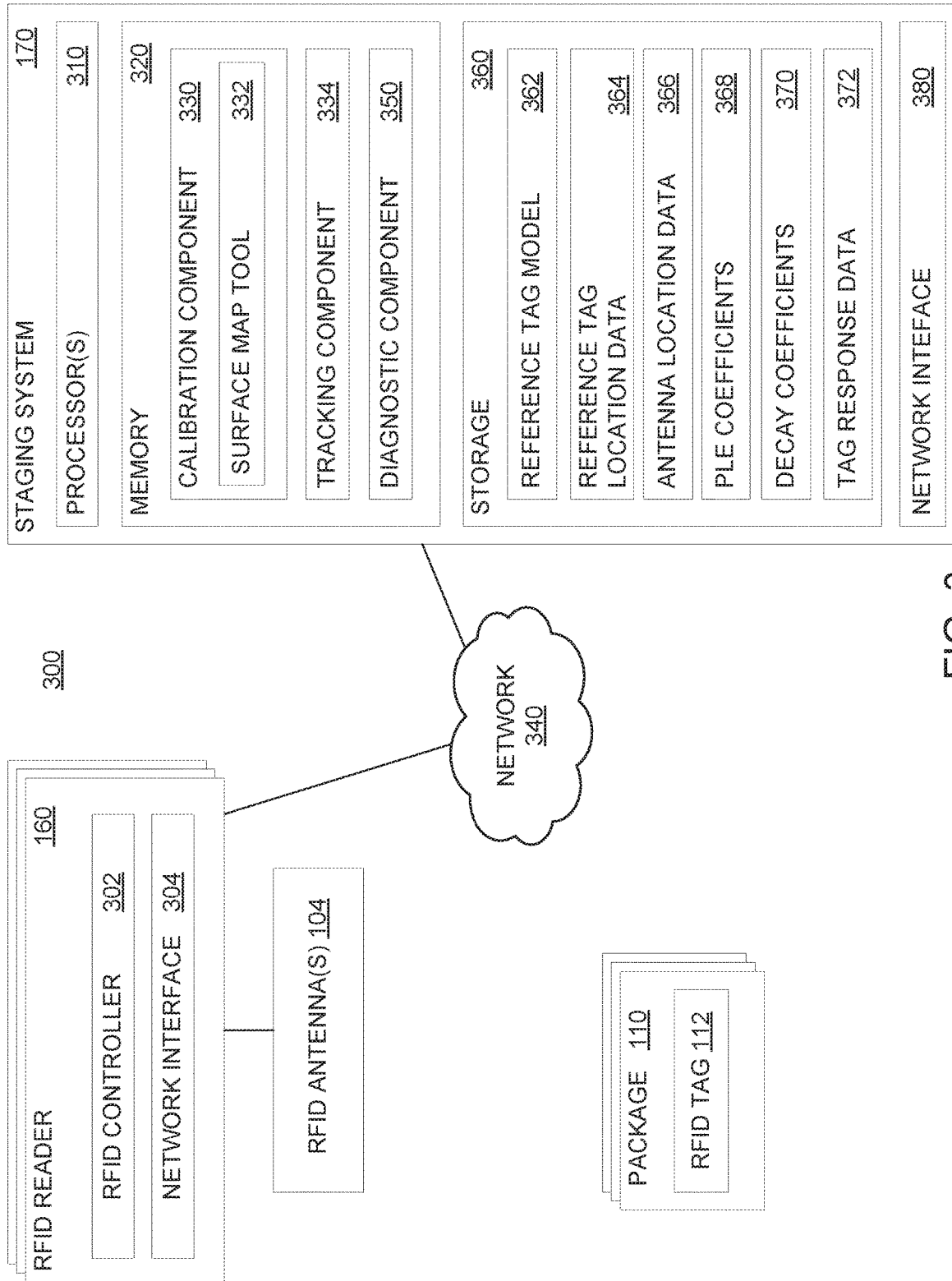
FIG. 3 is a block diagram of a system that performs self-calibration for tracking packages placed in a staging area, according to one embodiment.

FIG. 3 is a block diagram of a system 300 configured to perform self-calibration for tracking packages placed in staging areas, according to one embodiment. In one embodiment, the system 300 may be implemented as part of the inventory system 100 depicted in FIG. 1. The system 300 includes a staging system 170 and one or more RFID readers 160, which are interconnected via a network 340. The staging system 170 is representative of a variety of computing devices (or systems), including a laptop computer, mobile computer (e.g., a tablet or a smartphone), server, etc. The network 340, in general, may be a wide area network (WAN), a local area network (LAN), a wireless LAN, a personal area network (PAN), a cellular network, etc. In a particular environment, the network 340 is the Internet.

The RFID reader(s) 160 includes an RFID controller 302, which can include hardware components, software modules, or combinations thereof, and a network interface 304. The RFID controller 302 is communicatively coupled to one or more RFID antenna(s) 104 and controls their function. For example, the RFID controller 302 can activate and deactivate the RFID antenna(s) 104 to control when the RFID antenna(s) 104 emits and receives RFID signals. The RFID controller 302 can evaluate the RFID responses received from RFID tags to aid the staging system 170 in performing self-calibration of dynamic conditions at locations of the reference RFID tags 108. In one embodiment, the RFID controller 302 evaluates signal metrics corresponding to the RFID tags such as signal strength, RSSI, or another type of distance indicator to aid the staging system 170. In some embodiments, the RFID controller 302 can configure the number of read cycles performed when scanning for RFID tags and evaluate the RFID tag response count.

The RFID controller 302 is also communicatively coupled to the staging system 170, e.g., via the network interface 304. The RFID controller 302 may use the network interface 304 to communicate information obtained by the RFID controller 302 regarding signal metrics and/or RFID tag response count to the staging system 170. The network interface 304 may be any type of network communications interface that allows the RFID controller 302 to communicate with other computers and/or components in the system 300 via a data communications network (e.g., network 340).

The staging system 170 includes processor(s) 310, a memory 320 (e.g., volatile, non-volatile, etc.), storage 360, and a network interface 380. The storage 360 may be a combination of a fixed and/or removable storage, such as fixed disc drives, removable memory cards, optical storage, network attached storage (NAS), or storage-area-network (SAN). The network interface 380 may be any type of network communications interface that allows the staging system 170 to communicate with other computers and/or components in the system 300 via a data communications network (e.g., network 340). The memory 320 includes a calibration component 330, a tracking component 334, and a diagnostic component 350, each of which can include hardware and/or software components. The storage 360 includes a reference tag model 362, reference tag location data 364, antenna location data 366, PLE coefficients 368, decay coefficients 370, and tag response data 372. The reference tag location data 364 includes the pre-configured locations (e.g., coordinates in 3D space) of the reference RFID tags 108 within the staging areas 114 A-K. The antenna location data 366 includes the pre-configured locations (e.g., coordinates in 3D space) and orientations (e.g., antenna directions) of the RFID antennas 104 in proximity to the staging areas 114 A-K.

In one embodiment, the calibration component 330 is configured to periodically (e.g., at predetermined time intervals) perform self-calibration to account for dynamic conditions (e.g., environmental and/or temporal conditions) present at the reference RFID tag locations within a staging area 114. As shown, the calibration component 330 includes a surface map tool 332, which can include hardware and/or software components. In one embodiment, the surface map tool 332 can obtain the pre-configured locations of the reference RFID tags 108 from the reference tag location data 364 and obtain the pre-configured locations and orientations of the RFID antenna(s) 104 from the antenna location data 366. The surface map tool 332 can determine a distance and angle between each reference RFID tag 108 and RFID antenna 104 based on the pre-configured location and orientation information. For example, the surface map tool 332 can use a distance metric, such as the Euclidean distance metric in 3D space, to determine the distance between each reference RFID tag 108 and RFID antenna 104.

The surface map tool 332 uses the distance information to generate, for each reference RFID tag 108, a first parameter representative of at least one environmental (or atmospheric) condition at the location of the reference RFID tag 108. In some embodiments, the first parameter is a PLE coefficient. The path loss generally represents a signal attenuation between the transmitted signal power and the received signal power and can occur due to various phenomena such as path loss, reflection, diffraction, fading, etc. The relationship between the transmit and receive power is given by the Friis free space equation in (1):

$$\frac{P_r}{P_t}(d) = \frac{G_r G_t \lambda^2}{(4\pi)^2 d^2} \quad (1)$$

where $G_t$ and $G_r$ are the transmit and receive antenna gains, $\lambda$ is the wavelength (e.g., obtained from the frequency that the system uses to communicate), d is the distance between the transmitter and the receiver antennas, $P_t$ is the transmitted power, and $P_r$ is the received power. Equation (1) generally assumes a PLE=2, which is representative of a free space environment.

The surface map tool 332 can use the distance information and RFID signal characteristics (e.g., RSSI) obtained for a given reference RFID tag 108 to estimate the PLE coefficient used in a signal strength to distance equation (e.g., equation (1)) for every combination of the reference RFID tag 108 and RFID antenna 104. In one implementation, the PLE can be determined in relation to a reference point ($d_0$) using equation (2):

$$\hat{p}(d) = p(d_0) - 10n\log\left(\frac{d}{d_0}\right) \quad (2)$$

where p is the received power at the reference distance $d_0$, $\hat{p}$ is the estimated power of p, and n is the PLE. By minimizing the mean square error of the received power and the estimated power $(p-\hat{p})^2$, equation (2) can be solved to find n as follows:

$$f(n) = \sum_{i=1}^{k} \left(p_i - p_0 + 10n\log\left(\frac{d_i}{d_0}\right)\right)^2 \quad (3)$$

where k is the number of distances from the transmitter. By equating the derivative of f(n) to zero, an estimate of the PLE, n, can be determined. Note that equations (2) and (3) are provided as a reference example of a technique that can be used to estimate PLE. In general, those of ordinary skill in the art will recognize that other techniques (e.g., based on equation (1)) can be used to estimate the PLE. In some cases, the value of the PLE coefficient may be within a range of 2 and 6, where the value of "2" represents a free space environment and the value of "6" represents a noisy environment. By using the known location and orientation information, the surface map tool 332 can search for the optimal value of the PLE (e.g., used in the Friis equation) that is representative of the environmental conditions at the particular reference RFID tag location.

In some embodiments, the number of first parameters (e.g., PLE coefficients) determined for each reference RFID tag is based on the number of RFID antennas 104 deployed to a staging area 114. For example, a single PLE coefficient is determined for each reference RFID tag 108 in the case a single RFID antenna 104 is deployed; two PLE coefficients are determined for each reference RFID tag 108 in the case two RFID antennas 104 are deployed; and so on.

In one embodiment, the surface map tool 332 can use the distance information and tag response data 372 to generate, for each reference RFID tag 108, a second parameter(s) (e.g., decay coefficients 370) representative of the reference RFID tag response rate behavior for different distances to an RFID antenna 104. In general, the read rate of an RFID tag by an RFID antenna (coupled to a RFID reader) can be estimated by the tag response count in a fixed number of read (or interrogation) cycles sent from the RFID antenna. In some cases, the relationship between the tag read rate (e.g., estimated by the tag response rate) and the distance between the RFID tag and RFID antenna can be modeled by a sigmoid curve. For example, the read rate of an RFID tag may have a high value (e.g., close to 1) when the RFID tag is within a certain distance from the RFID antenna. The read rate of the RFID tag may then decrease linearly with increments of the distance until the read rate of the RFID tag has a low value (e.g., close to 0). Equation (4) is a reference example of a function that can be used to model the relationship between the read rate of the reference RFID tag 108 and the RFID antenna 104:

$$r_i = \frac{1}{1 + e^{a_i d_i + b_i}} \quad (4)$$

where r is the reference RFID tag read rate at an RFID antenna i, d is the distance from the reference RFID tag to the RFID antenna i, and a and b are parameters. The distance d between a reference RFID tag 108 at a location (x, y, z) and an RFID antenna 104 at a location ($x_i$, $y_i$, $z_i$) can be determined using the following:

$$d_i = \sqrt{(x-x_i)^2 + (y-y_i)^2 + (z-z_i)^2} \quad (5)$$

In this example, the surface map tool 332 can estimate second parameters (e.g., a and b in (5)) for each reference RFID tag 108, based on the current tag response rate for that reference RFID tag 108 and the distance information, and use the second parameters as the decay coefficients 370 for the reference RFID tag 108. In some embodiments, estimating a and b may involve using a linear regression technique (e.g., least squares method, etc.).

In one embodiment, the tracking component 334 is configured to determine the location of an RFID tagged package (e.g., package 110) based on the PLE coefficients 368 and decay coefficients 370. In one embodiment, for example, the tracking component 334 determines the distance between the package RFID tag 112 and each reference RFID tag 108 using the PLE coefficients 368 and decay coefficients 370 for that reference RFID tag 108. The tracking component 334 inputs these distances into a first machine learning algorithm (e.g., k-NN algorithm) to determine the nearest reference RFID tags 108 to the package RFID tag 112, and inputs the nearest reference RFID tags 108 into a second machine learning algorithm (e.g., Monte Carlo algorithm) to determine the location (e.g., storage location 106) of the package 110.

In one embodiment, the diagnostic component 350 is configured to periodically evaluate the properties of the reference RFID tags 108 and determine, based on the evaluation, whether to designate a reference RFID tag 108 for replacement. The diagnostic component 350 can include hardware and/or software components. To evaluate the health (or performance) of the reference RFID tags 108, the diagnostic component 350 generates a reference model of the reference RFID tag properties' behavior over a period of time. The diagnostic component 350 then periodically (e.g., at predetermined time intervals) compares the current RFID signal characteristics with the reference model of the RFID tag properties. In some embodiments, the diagnostic component 350 may evaluate the reference RFID tags 108 at times when there are no RFID tagged items in the staging area 114. In one example, the diagnostic component 350 can be configured to perform the evaluation at predetermined time intervals (e.g., every ten seconds) within a designated time period (e.g., every morning for an hour, every night for two hours, etc.).

If the diagnostic component 350 determines that there is a significant difference (or variance) (e.g., greater than or equal to a threshold difference) between the RFID tag model properties and the actual reference RFID tag properties, the diagnostic component 350 can flag the particular reference RFID tag 108 for replacement. In this manner, the diagnostic component 350 can identify unreliable components in order to improve the reliability and accuracy of the staging system 170.

Figure 4:
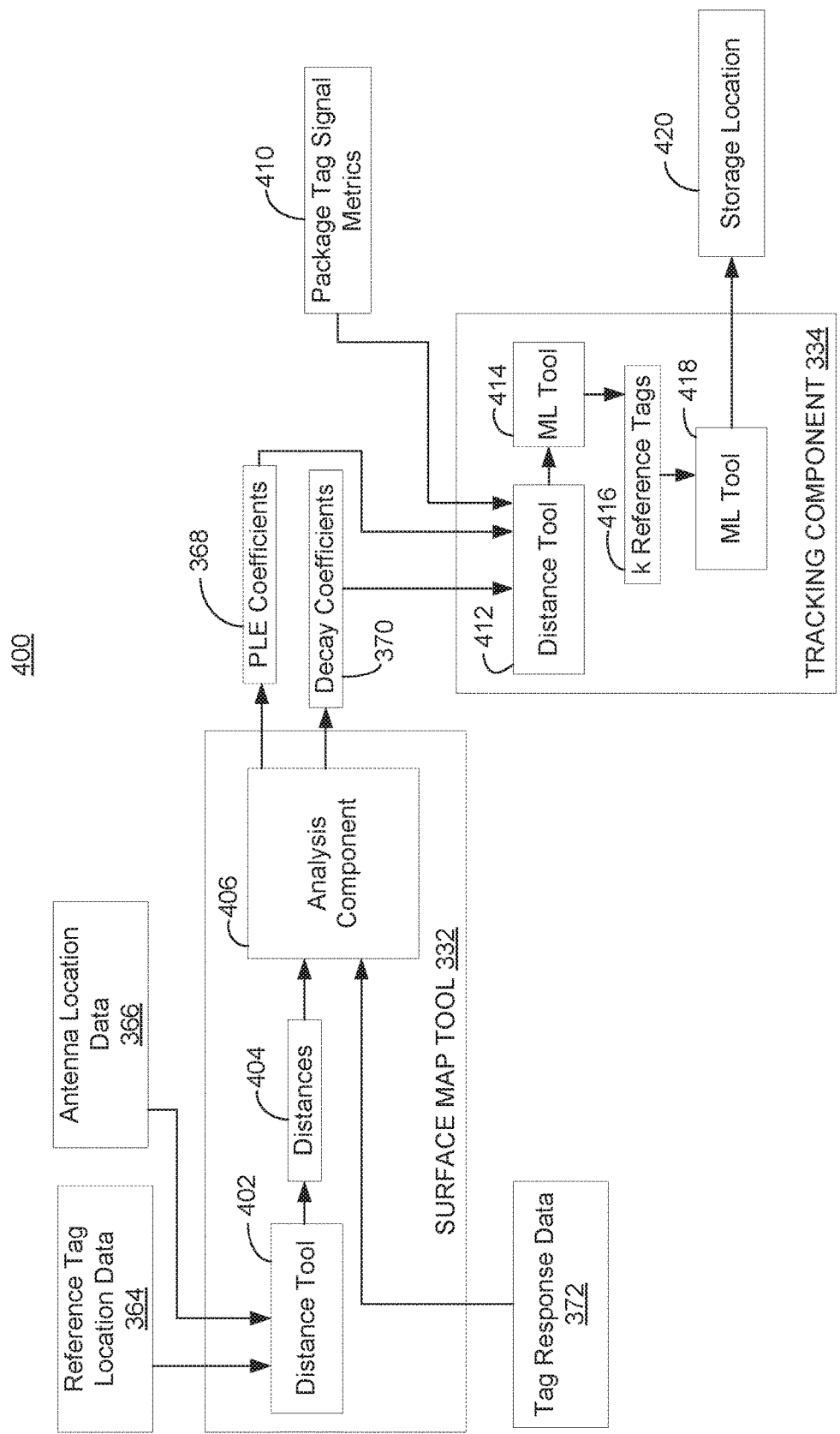
FIG. 4 is a block diagram illustrating an example workflow for performing self-calibration of a staging area, according to one embodiment.

FIG. 4 is a block diagram illustrating an example workflow 400 for performing self-calibration of a staging area for accurate tracking of packages placed in the staging area, according to one embodiment. As shown, the surface map tool 332 includes a distance tool 402 and an analysis component 406. The distance tool 402 receives the reference tag location data 364 and the antenna location data 366, and generates (e.g., using a distance metric, such as equation (5)) distances 404 between each reference RFID tag 108 and RFID antenna 104. The analysis component 406 receives the distances 404 and estimates (e.g., using equations (2) and (3)) the PLE coefficients 368 representative of the environmental conditions at the location of the reference RFID tag 108. The analysis component 406 also receives the tag response data 372, which includes the current read rates of each reference RFID tag 108 by different RFID antennas 104 at different distances. The analysis component 406 uses the tag response data 372 along with the distances 404 to estimate the decay coefficients 370. Together, the PLE coefficients 368 and the decay coefficients 370 can be used by the staging system 170 to represent the dynamic conditions (e.g., due to varying environmental conditions and changing RFID tag properties over time) present at every storage location 106 within a staging area 114.

As shown, the tracking component 334 includes a distance tool 412 and machine learning (ML) tools 414 and 418. The distance tool 412 receives the PLE coefficients 368, decay coefficients 370, and the package tag signal metrics 410 (e.g., RSSI, tag read rate, etc., of a package RFID tag 112). The distance tool 412 computes the distance between the package RFID tag 112 and each reference RFID tag 108 using the PLE coefficients 368 and the decay coefficients 370 for the reference RFID tag, and the package tag signal metrics 410. The distance tool 412 inputs the computed distances into the machine learning tool 414, which is configured to identify the nearest (e.g., k) reference RFID tags 416 to the package RFID tag (e.g., within a threshold distance using an Euclidean distance metric). The nearest reference RFID tags 416 are then input into the machine learning algorithm 418, which is configured to determine the storage location 420 from the nearest reference RFID tags 416. Here, the storage location 420 corresponds to one of the storage locations 106 in a staging area 114.

Figure 5:
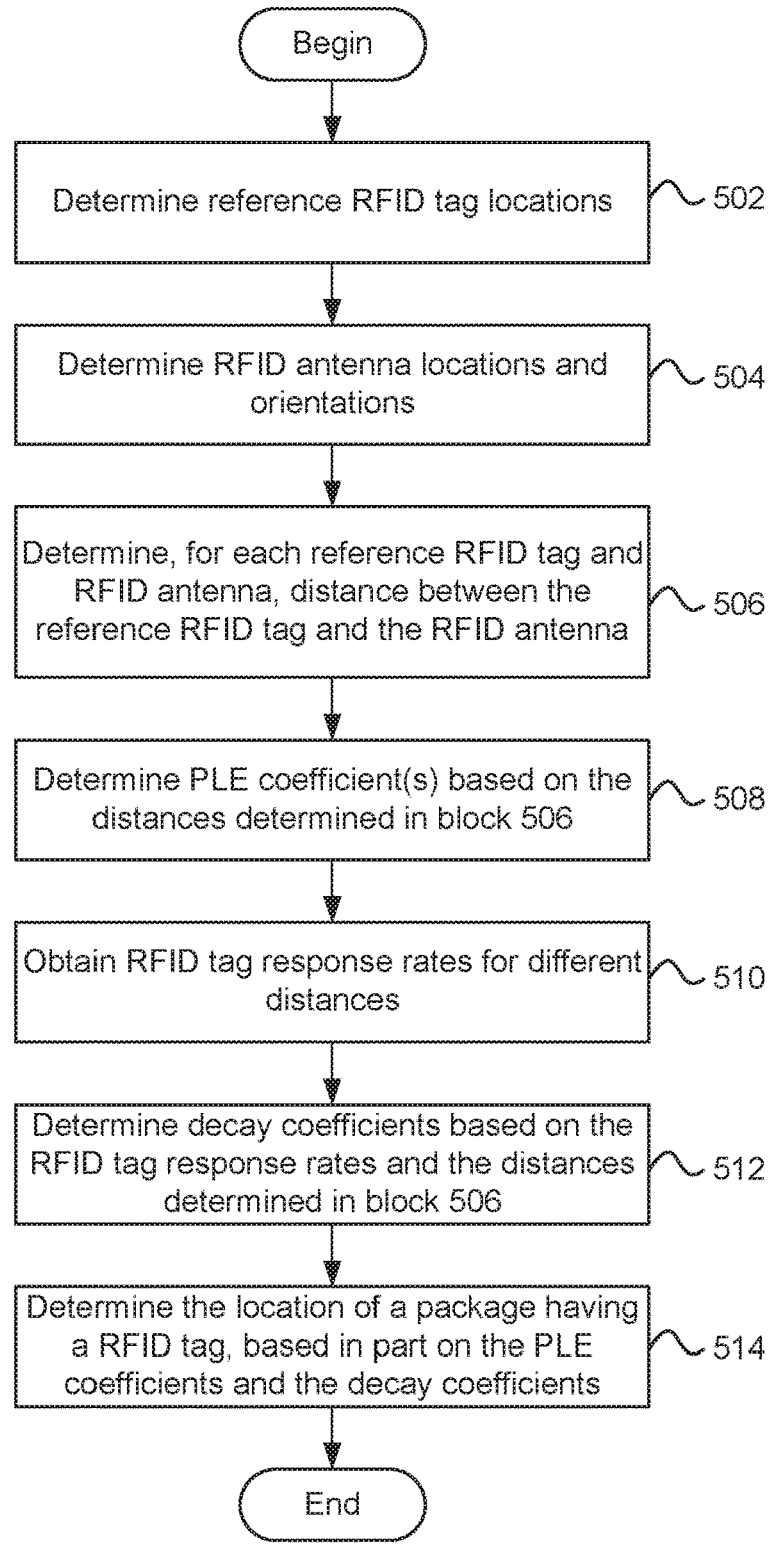
FIG. 5 is a flowchart illustrating a method for performing self-calibration, according to one embodiment.

FIG. 5 is a flowchart illustrating a method for performing self-calibration, according to one embodiment. The method 500 may be performed by one or more components of the staging system 170.

The method 500 begins at block 502, where the staging system 170 determines reference RFID tag locations in a staging area (e.g., staging area 114). For example, as noted, the reference RFID tag locations may be pre-configured for the staging area, and the staging system 170 may receive information (e.g., reference tag location data 364) indicating the pre-configured location for each reference RFID tag (e.g., reference RFID tag 108). At block 504, the staging system 170 determines the locations and orientations of the RFID antennas in the staging area. For example, similar to the reference RFID tag locations, the locations and orientations for the RFID antennas may be pre-configured for the staging area, and the staging system 170 may receive information (e.g., antenna location data 366) indicating the pre-configured location and orientation for each RFID antenna (e.g., RFID antenna 104).

At block 506, the staging system 170 determines, for each reference RFID tag and RFID antenna, a distance between the reference RFID tag and the RFID antenna, based on the reference RFID tag locations and the RFID antenna locations. In one embodiment, the distance between each reference RFID tag and RFID antenna is a 3D Euclidean distance. In one embodiment, the staging system 170 also determines, for each reference RFID tag and RFID antenna, an angle between the reference RFID tag and the RFID antenna, based on the reference RFID tag locations and the RFID antenna locations. In one embodiment, there may be a single RFID antenna in proximity to the staging area 114.

At block 508, the staging system 170 determines PLE coefficient(s) (e.g., PLE coefficients 368) based on the distances between the reference RFID tags and the RFID antennas. In one embodiment, the staging system 170 can estimate the PLE coefficients used in equations (2) and (3) based on the distances. In one embodiment, the number of PLE coefficients determined for a given reference RFID tag is based on the number of RFID antennas deployed in a staging area. For example, if a single RFID antenna is used, a single PLE coefficient may be determined for each reference RFID tag; if two RFID antennas are used, two PLE coefficients may be determined for each reference RFID tag; and so on.

At block 510, the staging system 170 obtains RFID tag response rates for the reference RFID tags. At block 512, the staging system 170 determines decay coefficients based on the RFID tag response rates and the distances obtained from the known locations of the reference RFID tags and the RFID antennas. At block 514, the staging system 170 determines the location of a package having a RFID tag, based in part on the PLE coefficients and the decay coefficients.

Figure 6:
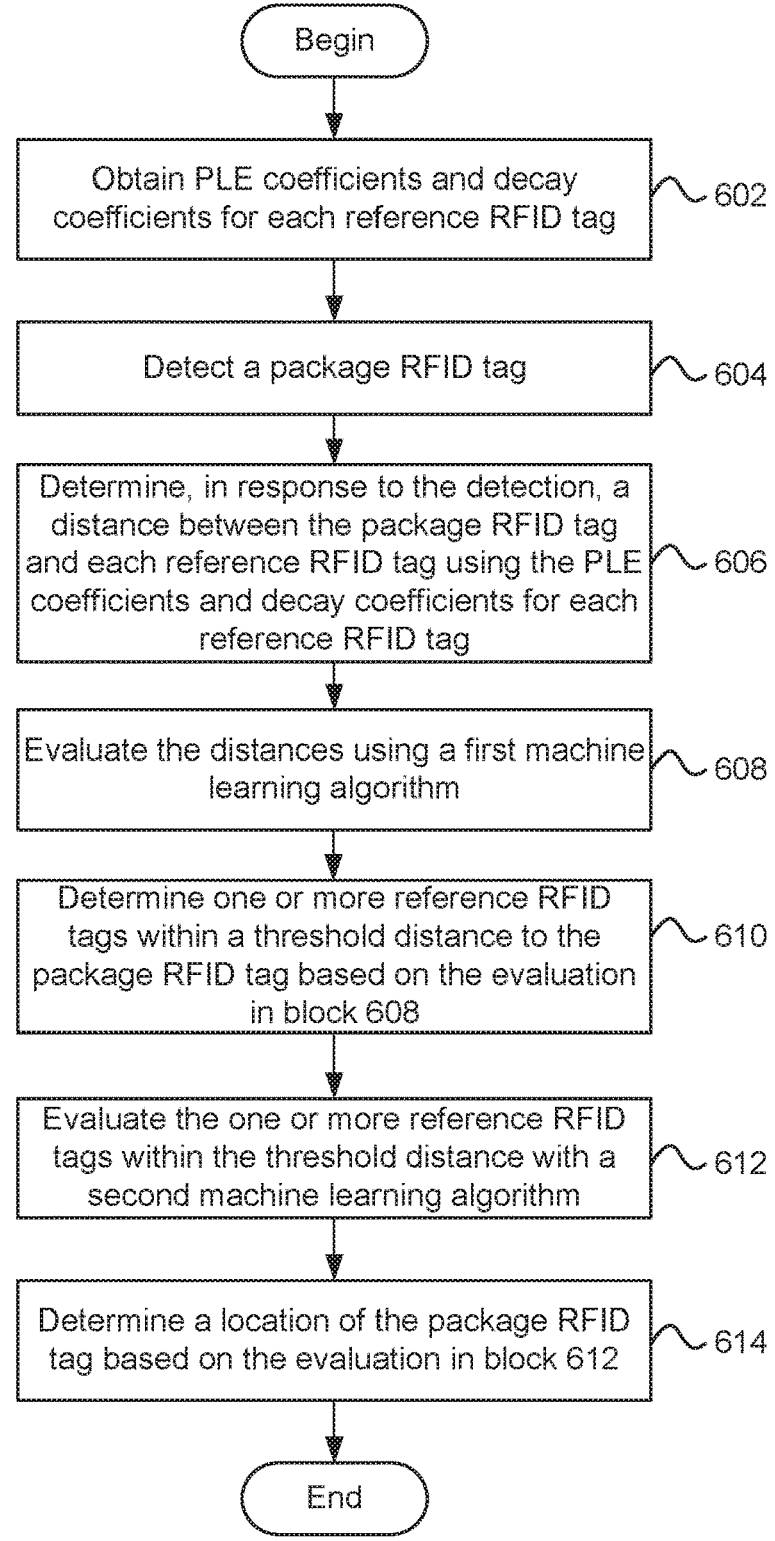
FIG. 6 is a flowchart illustrating a method for determining the location of a package in a staging area, according to one embodiment.

FIG. 6 is a flowchart illustrating a method 600 for determining the location of a package in a staging area, according to one embodiment. The method 600 may be performed by one or more components of the staging system 170.

The method 600 begins at block 602, where the staging system 170 obtains PLE coefficient(s) (e.g., PLE coefficient(s) 368) and decay coefficient(s) (e.g., decay coefficient(s) 370) for each reference RFID tag (e.g., reference RFID tag 108). At block 604, the staging system 170 detects a package RFID tag (e.g., package RFID tag 112) in the staging area (e.g., staging area 114). For example, the staging system 170 can monitor and receive an RSSI from the package RFID tag and a current response rate of the package RFID tag, e.g., via an RFID antenna coupled to an RFID reader. At block 606, the staging system 170 determines, in response to the detection, a distance between the package RFID tag and each reference RFID tag using the PLE coefficient(s) and decay coefficient(s) for each reference RFID tag, the RSSI from the package RFID tag, and the current response rate of the package RFID tag. At block 608, the staging system 170 evaluates the distances using a first machine learning algorithm (e.g., a k-NN algorithm).

At block 610, the staging system 170 determines one or more (e.g., k number of) reference RFID tags that are within a threshold distance to the package RFID tag, based on the evaluation (e.g., performed in block 608). At block 612, the staging system 170 evaluates the one or more reference RFID tags within the threshold distance with a second machine learning algorithm. At block 614, the staging system 170 determines a location of the package RFID tag based on the evaluation (e.g., performed in block 612).

Figure 7:
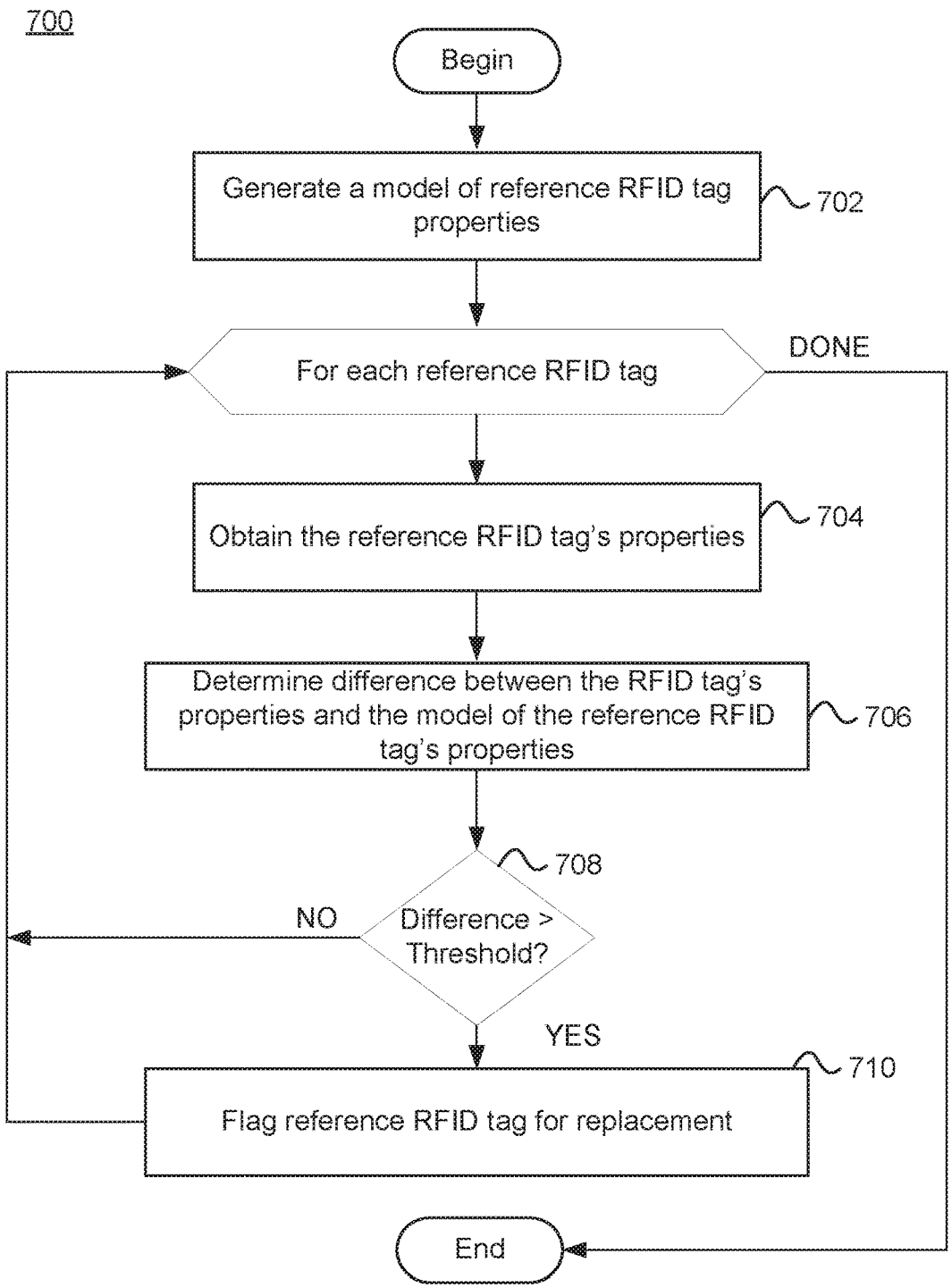
FIG. 7 is a flowchart illustrating a method for verifying the reliability of reference RFID tags, according to one embodiment.

FIG. 7 is a flowchart illustrating a method 700 for verifying the reliability of reference RFID tags in a staging area, according to one embodiment. The method 700 may be performed by one or more components of the staging system 170.

The method 700 begins at block 702, where the staging system 170 generates a (reference) model of reference RFID tag properties. In one embodiment, the reference model is a model of the how the RFID tag properties vary over time. The RFID tag properties, for example, can include a signal strength, a response rate (to read requests), etc.

For each reference RFID tag, the staging system 170 obtains the reference RFID tag's properties, e.g., via an RFID antenna 104 (block 704). Once obtained, the staging system 170 determines the difference between the reference RFID tag's properties and the model of the reference RFID tag's properties (block 706). If, at block 708, the difference satisfies a predetermined condition (e.g., the difference is greater than a threshold), the staging system 170 flags the reference RFID tag for replacement (block 710). If, at block 708, the difference does not satisfy the predetermined condition (e.g., the difference is less than or equal to a threshold), the staging system 170 proceeds to evaluate the next reference RFID tag.

In some embodiments, the staging system 170 may be configured to evaluate the reference RFID tags (e.g., to determine whether the reference RFID tags are reliable) at designated time periods. For example, within a designated time window (e.g., every morning for two hours, every night for three hours, etc.) the staging system 170 can periodically (e.g., every five seconds, ten seconds, etc.) perform blocks 704, 706, 708, and 710 to identify the unreliable reference RFID tags.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a frame providing a plurality of storage locations for storing items;
   a plurality of radio frequency identification (RFID) tags, wherein each storage location is in proximity to one or more of the plurality of RFID tags;
   at least one RFID antenna;
   at least one RFID reader coupled to the at least one RFID antenna and configured to identify each of the plurality of RFID tags;
   at least one processor; and
   a memory storing one or more applications, which, when executed by the at least one processor, performs an operation comprising:
      determining a distance between each of the plurality of RFID tags and the at least one RFID antenna;
      monitoring a received signal strength indicator (RSSI) from each of the plurality of RFID tags using the at least one RFID antenna;
      generating, for each RFID tag, at least one first parameter indicative of at least one environmental condition at a location of the RFID tag, based on the RSSI from the RFID tag and the distance between the RFID tag and the at least one RFID antenna; and
      tracking an RFID tagged item located in one of the plurality of storage locations based, at least in part, on the at least one first parameter for each of the plurality of RFID tags.

2. The system of claim 1, the operation further comprising:
   determining a current response rate of each of the plurality of RFID tags to requests received from the at least one RFID antenna; and
   generating, for each RFID tag, at least one second parameter indicative of a response rate behavior of the RFID tag for different distances to the at least one RFID antenna, based on the current response rate from the RFID tag and the distance between the RFID tag and the at least one RFID antenna.

3. The system of claim 2, wherein the RFID tagged item is tracked further based on the at least one second parameter for each of the plurality of RFID tags.

4. The system of claim 2, wherein the at least one first parameter and the at least one second parameter for each RFID tag are periodically generated based on a predetermined time interval.

5. The system of claim 2, wherein tracking the RFID tagged item comprises:
   monitoring an RSSI from the RFID tagged item using the RFID reader;
   determining a current response rate of the RFID tagged item to requests from the at least one RFID antenna; and
   determining a distance between the RFID tagged item and each of the plurality of RFID tags based, in part, on the RSSI from the RFID tagged item, the current response rate of the RFID tagged item, the at least one first parameter corresponding to the respective RFID tag, and the at least one second parameter corresponding to the respective RFID tag.

6. The system of claim 5, wherein tracking the RFID tagged item further comprises:
   processing the distances between the RFID tagged item and the plurality of RFID tags with a first machine learning algorithm to determine a first set of the plurality of RFID tags that are within a threshold distance from the RFID tagged item; and
   processing the first set of the plurality of RFID tags with a second machine learning algorithm to determine a location of the RFID tagged item, wherein the location corresponds to one of the plurality of storage locations.

7. The system of claim 1, wherein the at least one first parameter is a path loss exponent (PLE) coefficient used for determining the distance between the RFID tag and the at least one RFID antenna.

8. The system of claim 1, wherein a number of the at least one first parameter generated for each RFID tag corresponds to a number of the at least one RFID antenna.

9. A system, comprising:
   a plurality of radio frequency identification (RFID) tags disposed in a frame that provides a plurality of storage locations for storing items;
   at least one RFID antenna;
   at least one RFID reader coupled to the at least one RFID antenna and configured to monitor RFID signal characteristics of each of the RFID tags;
   at least one processor; and
   a memory storing one or more applications, which, when executed by the at least one processor, performs an operation comprising:
      obtaining, via the at least one RFID reader, a first set of RFID signal characteristics associated with each of the plurality of RFID tags at a first time instance of a plurality of time instances;
      predicting, based on a model of RFID tag behavior over a period of time, a second set of RFID signal characteristics at the first time instance; and
      determining, for each of the plurality of RFID tags, whether the RFID tag is unreliable based on the first set of RFID signal characteristics for the RFID tag and the second set of RFID signal characteristics.

10. The system of claim 9, the operation further comprising comparing the first set of RFID signal characteristics of each of the plurality of RFID tags with the second set of RFID signal characteristics.

11. The system of claim 10, wherein the determination is that the RFID tag is reliable if a difference between the first set of RFID signal characteristics and the second set of RFID signal characteristics satisfies a predetermined condition.

12. The system of claim 10, wherein the determination is that the RFID tag is unreliable if a difference between the first set of RFID signal characteristics and the second set of RFID signal characteristics satisfies a predetermined condition.

13. The system of claim 12, the operation further comprising marking the RFID tag for replacement after determining that the RFID tag is unreliable.

14. The system of claim 10, wherein the RFID signal characteristics comprises at least one of a relative signal strength and response rate to requests from the at least one RFID reader.

15. A method, comprising:
   identifying a plurality of radio frequency identification (RFID) tags disposed in a plurality of storage locations defined by a frame, wherein each storage location is in proximity to a different set of the plurality of RFID tags;

determining a distance between each of the plurality of RFID tags and at least one RFID antenna in proximity to the frame;

monitoring a received signal strength indicator (RSSI) from each of the plurality of RFID tags;

generating, for each RFID tag, a first parameter indicative of at least one environmental condition at a location of the RFID tag, based on the RSSI from the RFID tag and the distance between the RFID tag and the at least one RFID antenna; and tracking an RFID tagged item located in one of the plurality of storage locations based, at least in part, on the first parameter for each of the plurality of RFID tags.

16. The method of claim 15, further comprising:

determining a current response rate of each of the plurality of RFID tags to requests received from the at least one RFID antenna; and generating, for each RFID tag, a second parameter indicative of a response rate behavior of the RFID tag for different distances to the at least one RFID antenna, based on the current response rate from the RFID tag and the distance between the RFID tag and the at least one RFID antenna.

17. The method of claim 16, wherein the RFID tagged item is tracked further based on the second parameter for each of the plurality of RFID tags.

18. The method of claim 16, wherein the first and second parameters for each RFID tag are periodically generated based on a predetermined time interval.

19. The method of claim 16, wherein tracking the RFID tagged item comprises:

monitoring an RSSI from the RFID tagged item;

determining a current response rate of the RFID tagged item to requests from the at least one RFID antenna; and determining a distance between the RFID tagged item and each of the plurality of RFID tags based, in part, on the RSSI from the RFID tagged item, the current response rate of the RFID tagged item, and the first and second parameters corresponding to the respective RFID tag.

20. The method of claim 19, wherein tracking the RFID tagged item further comprises:

processing the distances between the RFID tagged item and the plurality of RFID tags with a first machine learning algorithm to determine a first set of the plurality of RFID tags that are within a threshold distance from the RFID tagged item; and processing the first set of the plurality of RFID tags with a second machine learning algorithm to determine a location of the RFID tagged item, wherein the location corresponds to one of the plurality of storage locations.

* * * * *